Jan. 12, 1960

H. C. KREINICK 2,920,894

QUICK ACTING TOOL HOLDER

Filed June 11, 1956

Inventor
Horace Kreinick
By Silverman & Mueller
attorneys

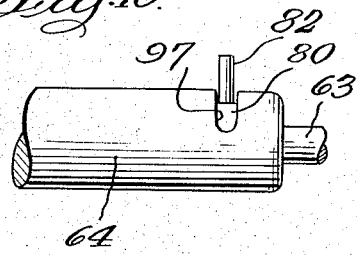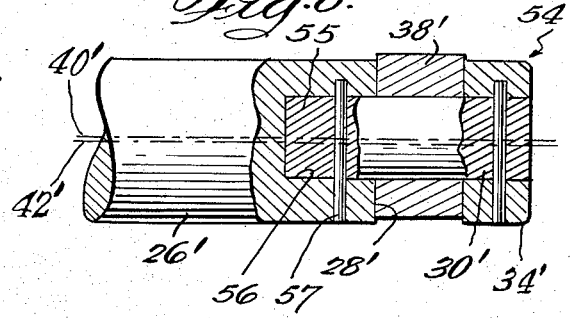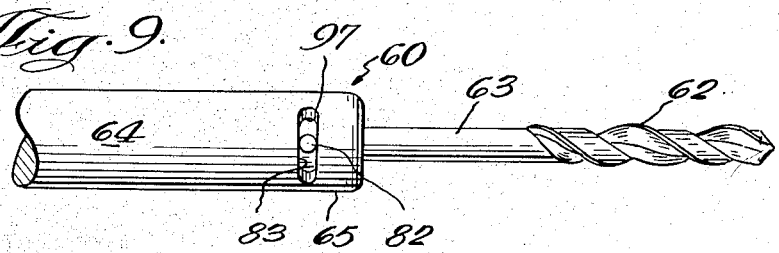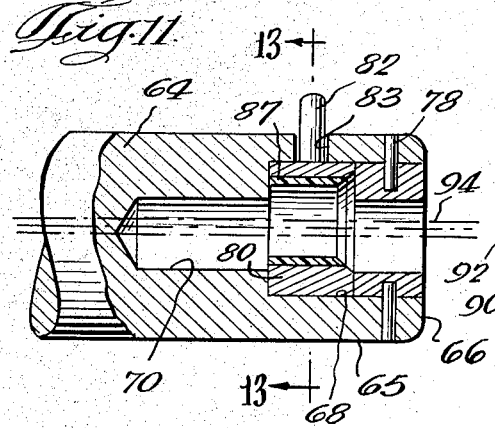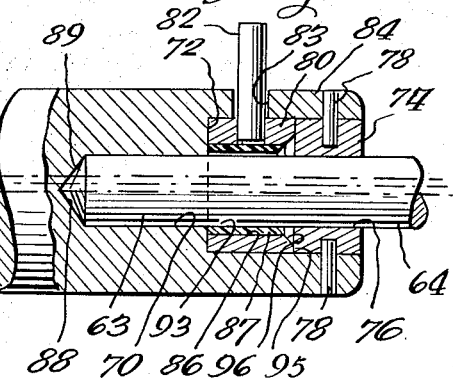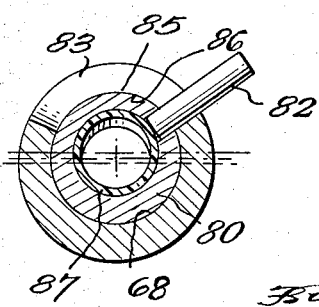

United States Patent Office 2,920,894
Patented Jan. 12, 1960

2,920,894

QUICK ACTING TOOL HOLDER

Horace C. Kreinick, Lincolnwood, Ill.

Application June 11, 1956, Serial No. 590,763

5 Claims. (Cl. 279—2)

This invention relates generally to a holder for tools and more particularly, relates to a novel construction for a tool holder which permits frictional locking of the tool thereto and subsequent release thereof very rapidly with relatively little physical effort and without necessity of employing additional tools.

It is a principal object of the invention to provide a tool holder of the character described which may be employed to hold either a tool having a shank, such as a drill bit or a tool having a mounting socket, such as in the hub of an abrading wheel, by means of a releasable friction joint capable of being made or released by quick manual rotary movement.

Another object of the invention is to provide a tool holder of the character described which includes a novel rotatable eccentric locking element; in one embodiment of the invention, said element being operable in the case of tool having a shank to effect said friction joint between the circumferential face of the element and the internal surface of an adjacent part of the tool holder and apply a wedging force to the shank to lock the tool in the holder; and in another embodiment, said element being operable to wedge the circumferential face of the element and the internal surface of the socket of a tool having a mounting socket.

A further important object of the invention is to provide a tool holder of the character described having a said rotatable eccentric locking element which enables the tool to be locked in place and released by means of a short, manual rotary movement.

Further objects of the invention reside in providing a tool of the character described which is characterized by its highly economical construction such that same may be made available at attractively modest prices; which enables locking and release of the tool rapidly with a minimum of physical effort and without requiring additional tools or fastening means; which may be employed with equal advantage with power tools or manually operated tools; and which is durable and strong.

These and other objects of the invention will become apparent as the disclosure evolves. Several embodiments of the invention have been described in detail in the specification and illustrated in the accompanying drawings in compliance with the patent laws, however, it is contemplated that the skilled artisan may devise minor variations in the form, arrangement, construction and size of the various parts of the invention without departing from the scope or sacrificing any of the advantages thereof.

In the drawings, wherein the same characters of reference have been employed to designate corresponding or equivalent parts throughout the several figures thereof:

Fig. 8 is a fragmentary elevational view of a modified form of the tool holder of Fig. 1 and having parts broken away to show structural details.

Fig. 9 is a fragmentary plan view of another embodiment of the invention for holding tools having shanks.

Fig. 10 is a partial side elevational view of the holder of Fig. 9.

Figs. 11 and 12 are sectional views taken through said holder, same being shown in locked condition in Fig. 11 and in unlocked condition in Fig. 12, with a drill bit inserted in the holder.

Fig. 13 is a sectional view taken along the line 13—13 of Fig. 11 and in the direction indicated.

Figure 1:
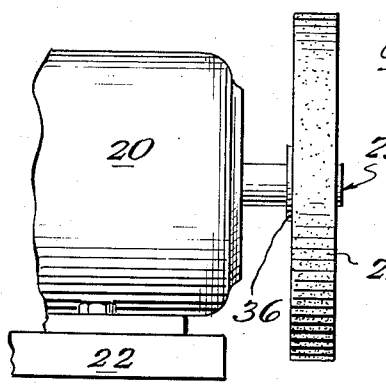
Fig. 1 is a fragmentary elevational view of a motor in association with which is mounted one embodiment of the invention, the tool holder illustrated holding a tool having a mounting socket, such as in a grinding wheel.
Figure 2:
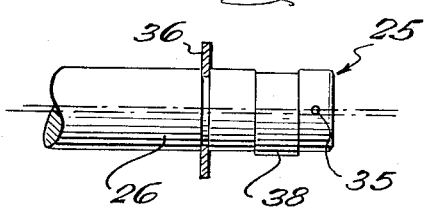
Fig. 2 is a fragmentary elevational view of the said tool holder of Fig. 1, but without the grinding wheel installed, to show the novel eccentrical locking element when in locking position.
Figure 4:
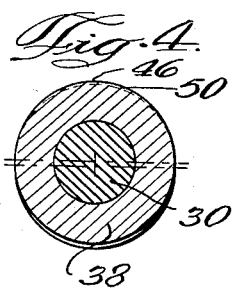
Fig. 4 is a sectional view taken along the line 4—4 of Fig. 3

Generally, the tool holder embodying the invention comprises an elongate, preferably cylindrical metal member on one end of which my novel tool holding structure has been provided for achieving the advantages declared hereinabove. The elongate metal member may comprise the driven shaft of a motor 20 as seen in Fig. 1, the protruding end of the shaft having the tool holder structure formed thereon. The invention also contemplates providing such a member having its opposite end preformed for engagement by the chuck of a power tool or a manually operated tool. Accordingly, such opposite end may be provided with a larger diameter formation the surface of which may be scored or otherwise formed to mount the tool holder in the chuck. Such chuck-engaging means for tool holders are very well known in the art and hence it has been deemed unnecessary to illustrate any specific example thereof since it will become apparent that any of a large variety of chuck-engaging means for tool holders may be employed. This invention is primarily concerned with the structure of the tool holder portion of the elongate metal member.

The embodiment of the tool holder of the invention for use with a tool having a socket has been illustrated in connection with Figs. 1 through 7. Such a tool may comprise an abrading wheel 21 which is driven from the motor 20 fixedly mounted on a supporting surface 22. The wheel 21 has its abrading material carried on a central hub or core 23, the passageway therethrough providing a mounting socket 24 for engagement by the tool holder of this embodiment of the invention which has been designated generally by the reference character 25. Same has been illustrated as an elongate, cylindrical member made of a hard metal, such as steel installed as the rotary driven shaft of the motor 20. The protruding end of the holder 25 is provided with the novel structure which enables the advantages of the invention to be achieved.

Figure 3:
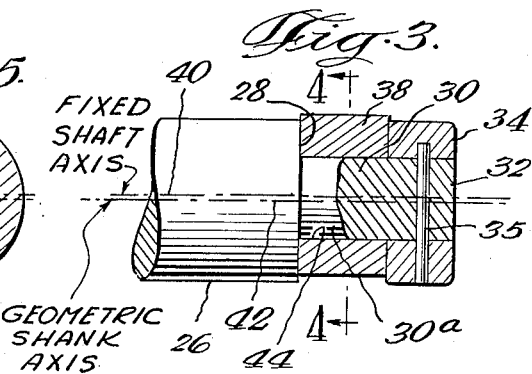
Fig. 3 is an enlarged view similar to Fig. 2 with portions illustrated in section to show important details of the tool holder.
Figure 6:
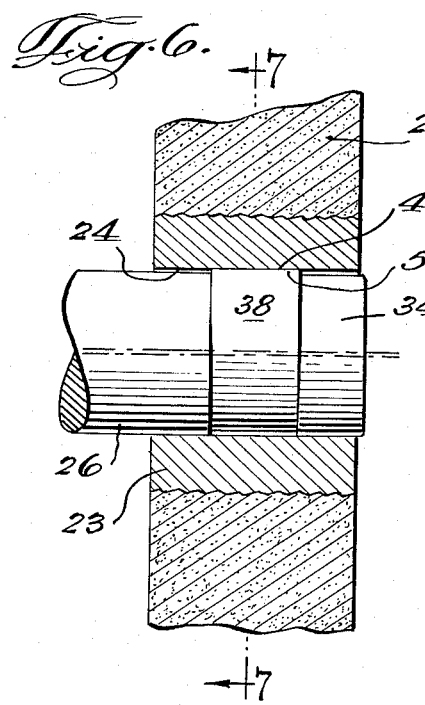
Fig. 6 is a vertical sectional view taken through the abrading wheel of Fig. 1.
Figure 7:
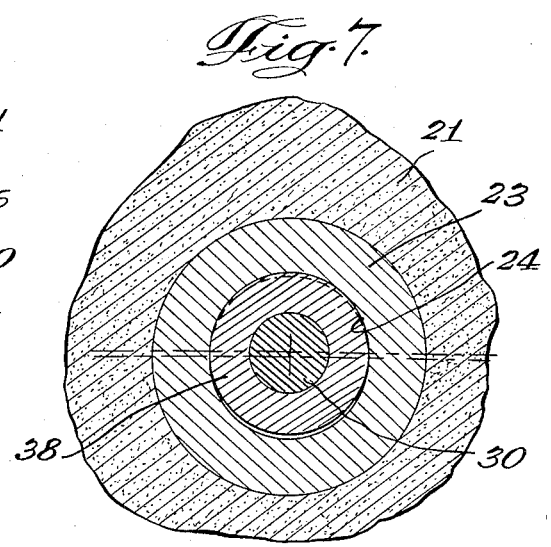
Fig. 7 is a sectional view taken along the line 7—7 of Fig. 6 and in the direction indicated.

The tool holder 25 includes a shank or barrel 26 of cylindrical formation on the end face 28 of which is integrally formed a reduced diameter cylindrical pin or stub shaft 30. The stub shaft 30 is fixed and extends axially outwardly from the face 28 and over the free end 32 thereof is flush mounted a cylindrical cap or washer 34 by means of a pin 35 engaged through aligned openings in the cap 34 and end 32. A stop member 36 may be provided on the barrel 26 inwardly spaced from the face 28 for positioning the wheel 21 properly as seen in Fig. 1, but this forms no part of the invention. The thickness of washer or cap 34 is substantially less than the length of stub shaft 30 so that when same is attached on the shaft with its outer surface flush with the outer face of end 32 as seen in Fig. 3, there is provided an intermediate length of said shaft designated 30a which extends between the end face 28 and the inside surface of cap 34. Rotatably mounted on the portion 30a is a circular collar or sleeve 38, the width of which is slightly less than the length of said portion 30a so that the sleeve 38 is substantially freely rotatable on pin 30. The collar or sleeve 38 comprises the rotatable eccentric locking element of the tool holder 25.

Certain critical dimensional relationships between shank 26, stub shaft 30, cap 34 and sleeve 38 are provided. The outside diameters of the shank portion 26, cap 34 and sleeve or collar 38 are substantially identical, this diameter being slightly less than the internal diameter of socket 24. The longitudinal center axis 40 of shaft 30 (and portion 30a) is offset from and parallel to the longitudinal center axis 42 of shank 26. Axis 42 passes through the geometrical center of shank 26 and cap 34 so that axis 40 of the shaft 30 likewise is offset from the geometric center of cap 34 in the same direction and amount as from axis 42. The sleeve 38 has a passageway 44 therethrough of a diameter slightly larger than the diameter of portion 30a so that the sleeve may be freely rotatable. When mounted on the intermediate portion 30a, the longitudinal axis of passageway 44 is offset from geometrical center of the sleeve 38 in the same amount as axis 40 is offset from axis 42. The sleeve 38 may be considered as eccentrically mounted on shaft 30 and will be capable of rotation between a first position where its annular circumferential edge is flush with the annular peripheral surface of the shank 26 and cap 34 to a second position where the sleeve 38 will protrude slightly beyond the peripheral surfaces of said shank and cap. Also it will be seen that in said first position, the geometric center of the sleeve and axis 42 are coincident.

Figure 5:
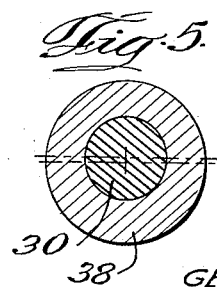
Fig. 5 is a similar sectional view except taken when the eccentric locking element is in unlocking position.

The first position of the sleeve 38 is illustrated in Fig. 5. Since the diameters of the shank 26, cap 34 and sleeve 38 are slightly less than the diameter of socket 24, when the peripheral surfaces of said shank, cap and sleeve are flush, the holder can be telescoped into the socket 24 until the wheel 21 engages the stop 36. The sleeve 38 will be disposed entirely within the socket 24. It may be possible to rotate the wheel 21 very carefully without upsetting the flush arrangement of the peripheral surface of the sleeve with respect to the cap and shank, since there will be a slight clearance between the tool holder and the internal surface of socket 24, but it is unlikely that this will occur. When the wheel 21 and shank 26 are rotated in either direction relative one another, the wheel is locked on the holder, this locking condition being shown in Figs. 3, 4 and 6. This could be done manually, or by energizing the motor 20, for example.

A rotary movement of the wheel 21 and shank 26 relative one another causes frictional engagement of the internal surface of socket 24 with the periphery of sleeve 38 and, therefore, rotation of sleeve 38 about the shaft 30. The sleeve is angularly displaced relative to the shank and cap to where the circumferential face 46 thereof is frictionally wedged into engagement with the internal surface of the socket 24 by reason of the portion 50 of said sleeve which protrudes beyond the peripheral faces of shank 26 and cap 34. It will be noted that the protruding portion 50 in this locked condition of the sleeve 38 is a very narrow crescent-shaped segment which forms a wedging frictional lock with the internal surface of the socket 24 and in which continued rotation of the sleeve in the same direction as rotated to effect the frictional joint only tightens the wheel on the holder. The wheel is very securely held and can be released only by rotating the same in a direction opposite to that which first caused same to lock on the holder. Although the tool is so securely held, only a relatively small movement is required to release the tool from the holder, which of course is permitted when the sleeve is rotated again to a position where its periphery is flush with the periphery of the shank 26 and cap 34. Thus, the geometric center of sleeve 38 is movable with respect to center axis 42, locking position thereof being attained when said center and axis are offset one relative to the other.

The holder 25 is assembled by sliding the sleeve or friction collar 38 over the end 32 and then securing the cap 34 by means of the fastener 35 engaged in the aligned openings. It will be appreciated that repair and replacement of parts will be readily accomplished because the cap 34 is so removable from shaft 30.

Referring to Fig. 8, there is shown a modified form of tool holder for tools having mounting sockets which has been designated by the reference character 54. The manner in which this holder functions is identical to that of holder 25, but the holder 54 differs from holder 25 in the manner in which the stub shaft thereof is secured to the shank of the holder. The shaft 30' is secured at its end 55 in a circular recess 56 formed in the end face 28' of shank 26', said shank and shaft having alignable openings for reception of a pin 57 to hold the parts in rigid assembly. The longitudinal axis 40' of the recess 56 is offset from the axis 42' of the shank 26' so that when the shaft 30' is secured in said recess, the same relationship of the axes of the shank 26', shaft 30', cap 34' and sleeve 38' is achieved as described in connection with corresponding structure of holder 25. Making the holder in the form shown in Fig. 8 is more economical and simpler since the pin 30' can be separately formed and then secured to the shank 26'. As explained, in all other respects the holders 25 and 54 are identical.

In Fig. 9 there is shown a second embodiment of the invention, which has been designated generally 60, for use in connection with a different type of tool, such as drill bit 62 having a shank 63. The holder 60 having a shank or barrel 64 may be used either with a motor or a manually operated tool in the same manner as described for holder 25. The end 65 of the holder 60 opposite to the end by which it is mounted has the tool holding structure embodying the invention. Said end 65 has an axially extending circular recess or socket 68 formed therein opening to end face 66 which at its rear end communicates with a second recess or socket 70 of reduced diameter, the juncture of said recesses 68 and 70 providing thereby a laterally extending shoulder 72. Seated in the open end of said socket 68 is a circular bushing 74 perforated as at 76 and secured by means of fasteners 78 engaged in aligned openings in the shank 64 and bushing 74.

The width of the bushing 74 is less than the length of recess 68 so that the inner surface of the bushing is spaced from the shoulder 72. Rotatably installed in this space or chamber is a circular sleeve or collar 80 to which is secured a lever 82 which is extended through a transversely extending slot 83 in the circumference of wall 84 defining passageway 68. The sleeve 80 has a longitudinal passageway 86 therethrough, the internal surface of which may be uniformly lined along its extent with a friction material 87.

The diameters of recess 70 and opening 76 are substantially identical and permit accommodation of the shank 63 therein. The inner end of the recess 70 may be tapered as at 88 to accommodate the tapered end 89 of the shank 63. Recess 70 and shank or barrel 64 have their longitudinal center axes co-axial, as indicated by the center line 90. The longitudinal center line 92 of recess 68 is parallel to and offset from the center line 90. Opening 76 in bushing 74 is offset from the geometric center of the bushing, however when secured in end 65, the center line 90 coincides with the longtiudinal axis of the opening 76.

The diameter of recess 68 is slightly larger than the outer diameter of sleeve 80 so that said sleeve may be freely rotatably installed in the space between bushing 74 and shoulder 72. The diameter of passageway 93 surrounded by the friction material 87 is substantially equal to the diameters of recess 70 and opening 76 and slightly larger than that of shank 63 of the drill bit, and the longitudinal axis of passageway 93 is parallel with and offset from the geometric center of the sleeve 80.

The sleeve 80 is rotatable between a position of locking seen in Fig. 11 and a position of unlocking as seen in Fig. 12. As seen in Fig. 12, the sleeve 80 has been rotated to a position where the passageway 93 therethrough is substantially aligned co-axially with the recess 70 and opening 76, and the drill bit has its shank 63 inserted through opening 76 and passageway 93 into the recess 70 as far as it will go. The geometric center of sleeve 80 and axis 90 are coincident. The sleeve 80 may be said now to be pivotal on the shank 63. To lock the drill bit, the sleeve 80 is rotated a small amount by means of lever 82, the particular embodiment being devised for rotation in a clockwise direction to effect the locking position of Fig. 11, however, the holder may be constructed to achieve locking in the opposite direction as well.

As seen in Fig. 11, the sleeve 80 has been rotated a small amount causing a tight frictional engagement between a segment of the peripheral surface 85 thereof and the surface 86 of the recess 68 as seen in Fig. 13. The geometric center of said sleeve is now displaced relative to axis 90. There is thus achieved a secure frictional locking between the sleeve 80 and barrel 64. At the same time, rotation of said sleeve will result in a wedging force exerted normal to the axis of the shank 63 by the sleeve. The frictional engagement between sleeve 80 and the internal surface of recess 68 plus the wedging force exerted against the shank of the drill bit maintains a very secure hold on the tool 62. To release said 62, the lever 82 is rotated in the opposite direction to effect alignment of the recess 70, passageway 93 and opening 76 as shown in Fig. 12.

To facilitate insertion of the tool 62 in the tool holder, the surface 95 of the sleeve may be countersunk as at 96 around the adjacent end of passageway 93 to provide a bevel on which the tool end 89 may ride. Because of the close tolerances between parts by reason of their size, the countersinking 96 will permit insertion of the shank 63 into recess 70 even through the recess 70 and passageway 93 are not perfectly, co-axially aligned, although substantial alignment is achieved when the lever 82 is positioned at the extremity 97 of slot 83.

It is believed the invention has been described in sufficient detail to enable the artisan skilled in the field of endeavor to which same pertains to understand and practice the invention. It is desired the invention be construed in accordance with the broad principles thereof set forth in the claims hereto appended.

I claim:

1. A quick acting tool holder comprising, a cylindrical shank member having a chuck end for connection to a high speed power tool and an opposite end adapted to be telescopically connected with the complemental cylindrical portion of a tool, means carried on the shank for affecting releasable locking and wedging engagement by relative rotation between the shank and the tool in an amount substantially less than a revolution, said locking means comprising a sleeve member of congruent cylindrical contour on the shank freely rotatable relative an axis parallel with and spaced from the shank axis, the rotational axis of the sleeve member being parallel with and spaced from the geometric axis of the sleeve to provide during rotation of the sleeve relative the shank conditions of alignment and misalignment of the sleeve and shank one relative the other, whereby during alignment the cylindrical portion of the tool may be freely moved axially relative the shank and during misalignment the tool will be wedged into engagement with the shank by the sleeve to prevent such axial movement of the tool, said wedging engagement occurring along a limited portion of the circumferences of the shank and sleeve during said condition of misalignment, said shank having an axially extending recess therein opening to an end face thereof and a second reduced diameter axial recess communicating with said first recess, the longitudinal axes of said recesses being parallel and offset one relative to the other, said sleeve being rotatably installed in said first recess, the sleeve having a passageway therethrough the axis of which is offset from the geometric center of the sleeve for reception of the cylindrical portion of said tool therethrough when the sleeve and shank are in said aligned condition.

2. A tool holder as described in claim 1 in which there is an annularly perforated bushing seated in said first recess across the open end thereof, said perforation being co-axial with the longitudinal axis of said second recess with the axis of the perforation offset from the geometric axis of the bushing, the diameters of said second recess, the passageway and the perforation being substantially equal to the diameter of the cylindrical portion of the tool.

3. A quick acting tool holder comprising, a cylindrical shank member having one end thereof formed as a conventional chuck-end for connection to a highspeed motor and its opposite end adapted to be telescopically connected with the complemental cylindrical portion of a tool and releasably locked therewith by means of a friction joint, means carried on the shank for effecting such locking of the tool and shank by relative rotary movement between said shank and tool in an amount substantially less than a complete revolution, said locking means comprising a cylindrical sleeve member of congruent contour freely rotatable relative to the shank on a fixed axis parallel with and offset from the geometric axis of the sleeve and the shank axis the same distance respectively, said sleeve capable of rotation to a first position in which said geometric and shank axes are substantially co-axial whereby in said alignment position the holder is capable of axial movement relative to the tool, and to a second position in which said geometric and shank axes are misaligned whereby in said misaligned position the shank and tool are wedgingly engaged together in said friction joint preventing separation of said telescopic connection, said friction joint being effected along a segment of the curved surfaces of said sleeve and cylindrical portion, said shank having an axially extending circular recess therein opening to an end face of the shank, and said sleeve being mounted in said recess.

4. A quick acting tool holder comprising, a cylindrical shank member having one end thereof formed as a conventional chuck-end for connection to a highspeed motor and its opposite end adapted to be telescopically connected with the complemental cylindrical portion of a tool and releasably locked therewith by means of a friction joint, means carried on the shank for effecting such locking of the tool and shank by relative rotary movement between said shank and tool in an amount substantially less than a complete revolution, said locking means comprising a cylindrical sleeve member of congruent contour freely rotatable relative to the shank on a fixed axis parallel with and offset from the geometric axis of the sleeve and the shank axis the same distance respectively, said sleeve capable of rotation to a first position in which said geometric and shank axes are substantially co-axial whereby in said alignment position the holder is capable of axial movement relative to the tool, and to a second position in which said geometric and shank axes are misaligned whereby in said misaligned position the shank and tool are wedgingly engaged together in said friction joint preventing separation of said telescopic connection, said friction joint being effected along a segment of the curved surfaces of said sleeve and cylindrical portion, said shank having an axially extending circular recess therein opening to an end face of the shank, and said sleeve being mounted in said recess, said sleeve having means attached thereto extending outwardly of the shank by which the sleeve may be manually rotated.

5. A quick acting tool holder comprising, a cylindrical shank member having one end thereof formed as a conventional chuck-end for connection to a highspeed motor and its opposite end adapted to be telescopically connected with the complemental cylindrical portion of a tool and releasably locked therewith by means of a friction joint, means carried on the shank for effecting such locking of the tool and shank by relative rotary movement between said shank and tool in an amount substantially less than a complete revolution, said locking means comprising a cylindrical sleeve member of congruent contour freely rotatable relative to the shank on a fixed axis parallel with and offset from the geometric axis of the sleeve and the shank axis the same distance respectively, said sleeve capable of rotation to a first position in which said geometric and shank axes are substantially co-axial whereby in said alignment position the holder is capable of axial movement relative to the tool, and to a second position in which said geometric and shank axes are misaligned whereby in said misaligned position the shank and tool are wedgingly engaged together in said friction joint preventing separation of said telescopic connection, said friction joint being effected along a segment of the curved surfaces of said sleeve and cylindrical portion, said shank having an axially extending circular recess therein opening to an end face of the shank, and said sleeve is mounted in said recess, there being a circular bushing secured on the interior of said recess across said open end, said bushing having an opening therethrough the axis of which is aligned with the axis of the shank, said shank having an internal socket therein of a diameter substantially equal to that of the opening in the bushing and to the diameter of the cylindrical portion of the tool, but less than the internal diameter of said recess, said socket being arranged behind said recess and communicating therewith for receiving said cylindrical portion therein.

References Cited in the file of this patent
UNITED STATES PATENTS

| | | |
|---|---|---|
| 785,162 | Freytag | Mar. 21, 1905 |
| 1,623,116 | Heuring | Apr. 5, 1927 |
| 1,734,439 | Livergood | Nov. 5, 1929 |
| 2,021,536 | Bath | Nov. 19, 1935 |
| 2,388,697 | Lombard | Nov. 13, 1945 |
| 2,400,686 | Cox | May 21, 1946 |
| 2,655,822 | Klavon | Oct. 20, 1953 |
| 2,675,653 | Bryant | Apr. 20, 1954 |